(12) United States Patent
Zhou et al.

(10) Patent No.: US 10,356,063 B2
(45) Date of Patent: Jul. 16, 2019

(54) IMAGE PROCESSING METHOD AND CLIENT DEVICE, IMAGE AUTHENTICATION METHOD AND SERVER DEVICE

(71) Applicants: BEIJING KUANGSHI TECHNOLOGY CO., LTD., Beijing (CN); PINHOLE (BEIJING) TECHNOLOGY CO., LTD., Beijing (CN)

(72) Inventors: Shuchang Zhou, Beijing (CN); Cong Yao, Beijing (CN); Xinyu Zhou, Beijing (CN); Qi Yin, Beijing (CN)

(73) Assignees: BEIJING KUANGSHI TECHNOLOGY CO., LTD., Beijing (CN); PINHOLE (BEIJING) TECHNOLOGY CO., LTD., Beijing (CN)

( * ) Notice: Subject to any disclaimer, the term of this patent is extended or adjusted under 35 U.S.C. 154(b) by 104 days.

(21) Appl. No.: 14/983,041

(22) Filed: Dec. 29, 2015

(65) Prior Publication Data
US 2017/0126646 A1 May 4, 2017

(30) Foreign Application Priority Data
Nov. 2, 2015 (CN) .......................... 2015 1 0731519

(51) Int. Cl.
*H04L 29/06* (2006.01)
(52) U.S. Cl.
CPC .......... *H04L 63/062* (2013.01); *H04L 63/068* (2013.01); *H04L 63/08* (2013.01)
(58) Field of Classification Search
CPC . H04L 63/0861; H04L 63/062; H04L 63/068; H04L 63/08; G06Q 20/40145; G06F 21/32; H04W 12/06
See application file for complete search history.

(56) References Cited

U.S. PATENT DOCUMENTS 7,725,718 B2 * 5/2010 Langford ................ G06F 21/64
705/51
9,762,560 B2 * 9/2017 Haynes ................ H04L 63/067
(Continued)

FOREIGN PATENT DOCUMENTS

| CN | 101520885 | 9/2009 |
| CN | 102137077 | 7/2011 |

(Continued)

OTHER PUBLICATIONS

First Chinese Office Action, issued in the corresponding Chinese patent application No. 201510731519.1, dated Jan. 9, 2018, 16 pages.

(Continued)

*Primary Examiner* — Tri M Tran
(74) *Attorney, Agent, or Firm* — Hamre, Schumann, Mueller & Larson, P.C.

(57) ABSTRACT

Provided are an image processing method and a client device, an image authentication method and a server device. The image processing method comprises: photographing an object to obtain a first image; sending a key acquiring request to a server and receiving a key from the server; generating a second image based on the key and the first image; and sending the second image to the server. The image authentication method comprises: receiving a key acquiring request from a client; generating a key and sending the key to the sever in response to the key acquiring request; receiving an image for authentication from the client; and authenticating the image for authentication by using the key.

18 Claims, 6 Drawing Sheets

(56) References Cited

U.S. PATENT DOCUMENTS

| | | | | |
|---|---|---|---|---|
| 2006/0242693 A1* | 10/2006 | Kussmaul | ............... | G06F 21/32 |
| | | | | 726/9 |
| 2008/0209547 A1* | 8/2008 | Funahashi | ............... | G06F 21/32 |
| | | | | 726/20 |
| 2009/0220076 A1 | 9/2009 | Kuraki et al. | | |
| 2011/0185402 A1 | 7/2011 | Wang et al. | | |
| 2014/0223175 A1* | 8/2014 | Bhatnagar | ................ | G09C 5/00 |
| | | | | 713/159 |
| 2015/0089241 A1* | 3/2015 | Zhao | ...................... | H04N 5/335 |
| | | | | 713/186 |
| 2016/0019538 A1* | 1/2016 | Arif | ..................... | G06Q 20/322 |
| | | | | 705/44 |
| 2016/0057135 A1* | 2/2016 | Jiang | .................. | H04L 63/0853 |
| | | | | 713/172 |

FOREIGN PATENT DOCUMENTS

| | | |
|---|---|---|
| CN | 102724041 | 10/2012 |
| CN | 103067367 | 4/2013 |
| CN | 103646375 | 3/2014 |
| CN | 104765986 | 7/2015 |

OTHER PUBLICATIONS

Second Chinese Office Action, issued in the corresponding Chinese patent application No. 201510731519.1, dated Jul. 13, 2018, 15 pages.

Third Chinese Office Action, issued in the corresponding Chinese patent application No. 201510731519.1, dated Nov. 12, 2018, 18 pages.

* cited by examiner

IMAGE PROCESSING METHOD AND CLIENT DEVICE, IMAGE AUTHENTICATION METHOD AND SERVER DEVICE

TECHNICAL FIELD

The present disclosure relates to a technical field of image authentication, and in particular to an image processing method and client device, and an image authentication method and server device.

BACKGROUND

With a promotion of internet communication technology, various businesses can be handled through Internet, for example requesting a new mobile phone card through Internet, opening an account through Internet, and so on. During process of handling these businesses, it is required to perform a remote identity authentication for a user so as to ensure authenticity and reliability of the user requesting business handling.

At present, a remote identity authentication method requires a user uploading a certificate image, for example an image of an identity card, then authenticity of the certificate image uploaded by the user is discriminated manually or automatically at a service provider, thus achieving identity authentication.

However, a main problem of such remote identity authentication method is that an attacker can fake an image by using various tools (for example, the image is synthesized by an image editing software), can misuse a certificate image of another one, or can photograph a certificate image of another one, and so on. The attacker can modify the details of the attacking image over and over again to mix up truth with falsehood, which would cause great difficulty in the remote identity authentication.

Therefore, there is a need for an image processing and identity authentication method capable of ensuring authenticity of a certificate image uploaded by a user and improving reliability of remote identity authentication.

TECHNICAL FIELD

In view of the above problem, the present disclosure is proposed to provide an image processing and image authentication method, which generates at a client a second image based on a currently photographed first image according to a key generated in real time at a server, and determines at the server whether the second image received from the client is reliable, thus improving reliability of image processing and identity authentication.

According to one aspect of embodiments of the present disclosure, there is provided an image processing method for a client, which comprises: photographing an object to obtain a first image; sending a key acquiring request to a server and receiving a key from the server; generating a second image based on the key and the first image; and sending the second image to the server.

According to another aspect of the embodiments of the present disclosure, there is provided an image authentication method for a server, which comprises: receiving a key acquiring request from a client; generating a key and sending the key to the sever in response to the key acquiring request; receiving an image for authentication from the client; and authenticating the image for authentication by using the key.

According to another aspect of the embodiments of the present disclosure, there is provided a client device, which comprises: an image collecting apparatus configured to photograph an object to obtain a first image; a communication apparatus configured to send a key acquiring request to a server and receive a key from the server; and an image processing apparatus configured to generate a second image based on the key and the first image, wherein the communication apparatus is further configured to send the second image to the server.

According to another aspect of the embodiments of the present disclosure, there is provided a server, which comprises a key generating apparatus configured to generate a key in real time in response to a key acquiring request received from a client; a communication apparatus configured to receive the key acquiring request from the client, send the key to the client, and receive an image for authentication from the client; and an image authenticating apparatus configured to authenticate the image for authentication based on the key.

According to another aspect of the embodiments of the present disclosure, there is further provided a client device, which comprises: one or more processors; one or more storage apparatuses; a communication apparatus; an image collecting apparatus; and computer program instructions stored in the storage apparatus. When the computer program instructions are executed by the processor, following steps are performed: controlling the image collecting apparatus to photograph an object to obtain a first image; controlling the communication apparatus to send a key acquiring request to a server and receive a key from the server; generating a second image based on the key and the first image; and controlling the communication apparatus to send the second image to the server.

According to another aspect of the embodiments of the present disclosure, there is provided a computer program product for image processing, which comprises one or more computer readable storage media with computer program instructions stored thereon. When being executed by a processor, the computer program instructions cause the processor: controlling an image collecting apparatus to photograph an object to obtain a first image; controlling a communication apparatus to send a key acquiring request to a server and receive a key from the server; generating a second image based on the key and the first image; and controlling the communication apparatus to send the second image to the server.

According to another aspect of the embodiments of the present disclosure, there is further provided a server device, which comprises: one or more processors; one or more storage apparatuses; a communication apparatus; and computer program instructions stored in the storage apparatuses. When the computer program instructions are executed by the processor, following steps are performed: controlling the communication apparatus to receive a key acquiring request from a client; generating a key and sending the key to the client in response to the key acquiring request; controlling the communication apparatus to receive an image for authentication from the client; and authenticating the image for authentication by using the key.

According to another aspect of the embodiments of the present disclosure, there is provided a computer program product for image authentication, which comprises one or more computer readable storage media with computer program instructions stored thereon. When being executed by a processor, the computer program instructions cause the processor: controlling the communication apparatus to receive a key acquiring request from a client; generating a key and sending the key to the client in response to the key acquiring request; controlling the communication apparatus to receive an image for authentication from the client; and authenticating the image for authentication by using the key.

Figure 1:
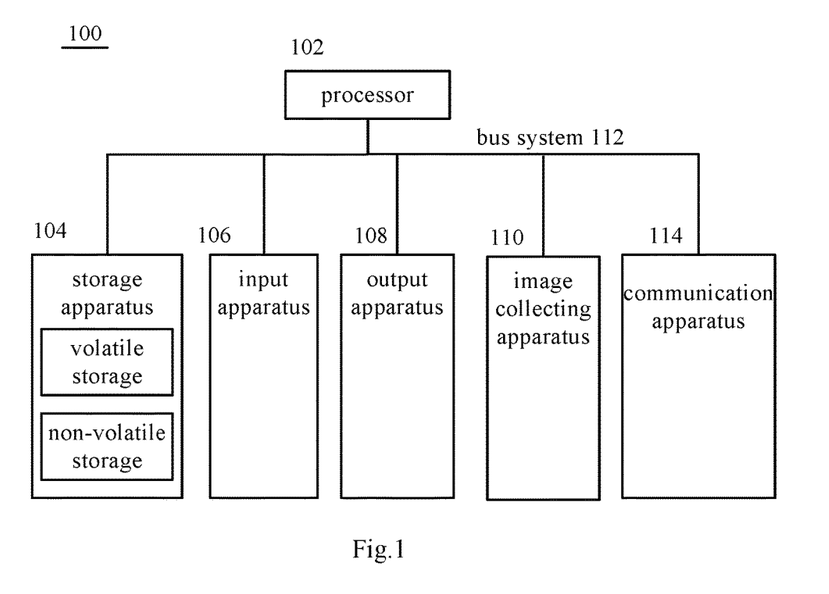
FIG. 1 is a schematic block diagram of an exemplary electronic device used to implement an image processing method and a client according to embodiments of the present disclosure.

According to the embodiments of the present disclosure, after the client obtains the first image by photographing the object, the client requests a key from the server and receives a key from the server in real time, and then generates a second image by a steganography algorithm based on the key received in real time and the first image. As such, it can be avoided that the second image uploaded by the client is not generated by the client based on the photographed first image, for example, the second image is generated based on an image stored in a storage apparatus of an electronic device as shown in FIG. 1 and invoked by the client, or an image obtained by the client from another electronic device through network. Therefore, it can be effectively avoided that an attacker misuses a certificate image originally generated by another one.

BRIEF DESCRIPTION OF THE DRAWINGS

Embodiments of the present disclosure would be described in detail by combining with the accompanying drawings, and the above and other purposes, characteristics and advantages of the present disclosure would become more evident. The figures are used to provide further understanding of the embodiments of the present disclosure, form a part of the specification, and are used to explain the present disclosure together with the embodiments of the present disclosure, but do not form a limitation to the present disclosure. In the drawings, the same reference marks generally represent the same means or steps.

DETAILED DESCRIPTION

In order to make purposes, technical solutions and advantages of the present disclosure more evident, exemplary embodiments according to the present disclosure would be described in detail by referring to the accompanying drawings. Obviously, the embodiments described below are just a part of embodiments of the present disclosure rather than all the embodiments of the present disclosure. It shall be understood that the present disclosure is not limited by the exemplary embodiments described below. Based on the embodiments of the present disclosure described below, all the other embodiments obtained by those skilled in the art without paying any inventive labor shall be deemed as falling into the protection scope of the present disclosure.

At first, an exemplary electronic device 100 which can be used to implement an image processing method and a client according to the embodiments of the present disclosure would be described by referring to FIG. 1.

As shown in FIG. 1, the electronic device 100 comprises one or more processors 102, one or more storage apparatuses 104, an input apparatus 106, an output apparatus 108, a communication apparatus 114 and an image collecting apparatus 110. These components are connected to each other through a bus system 112 and/or other forms of connecting mechanism (not shown in the figure). It shall be noted that components and structure of the electronic device 100 as shown in FIG. 1 are just for illustration, but not for limitation. The electronic device 100 may also have other components and structures according to requirements.

The processor 102 can be a central processing unit (CPU) or other forms of processing units having capabilities of data processing and/or instruction execution, and can control other components in the electronic device 100 to perform desired functions.

The storage apparatus 104 can comprise one or more computer program products. The computer program product can comprise various forms of computer readable storage medium, for example, a volatile storage and/or a non-volatile storage. The volatile storage can for example comprise a random access memory (RAM) and/or a cache memory and the like. The non-volatile storage can for example comprise a read-only memory (ROM), hard disk, and a flash memory and the like. One or more computer program instructions can be stored on the computer readable storage medium. The processor 102 can execute the program instructions, so as to realize functions (realized by the processor) in the embodiments of the present disclosure described below or other desirable functions. Various application programs and various data can be stored in the computer readable storage medium, for example, various data used and/or produced by the application programs and so on.

The input apparatus 106 can be an apparatus used by a user to input an instruction, and may comprise one or more of a keyboard, a mouse, a microphone and a touch screen. The instruction may for example be an instruction for the image collecting apparatus 110 collecting an image, an instruction for uploading the image, or an instruction for abandoning to upload the image.

The output apparatus 108 can output various information (for example, image or sound) to outside (for example, a user), and can comprise one or more of a display, a speaker and so on.

The image collecting apparatus 110 can photograph an object to obtain an image desired by the user (for example, photo, video, etc.) and store the image in the storage apparatus 104 for use by other components.

The communication apparatus 114 can implement wire or wireless communication.

Optionally, the exemplary electronic device for implementing the image processing method and client according to the embodiments of the present disclosure can be implemented as for example a smart phone, a tablet computer, a notebook computer, a desktop computer, etc.

Next, an exemplary server device 200 which can be used to implement an image authentication method and a server according to the embodiments of the present disclosure will be described by referring to FIG. 2.

Figure 2:
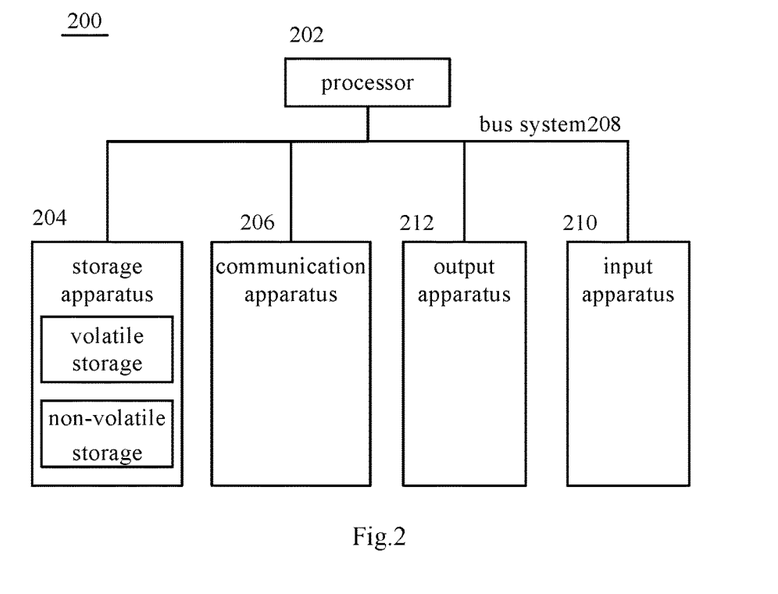
FIG. 2 is a schematic block diagram of an exemplary server device used to implement an image authentication method and a server according to the embodiments of the present disclosure.

As shown in FIG. 2, the server device 200 comprises one or more processors 202, one or more storage apparatuses 204 and a communication apparatus 206. These components are connected to each other through a bus system 208 and/or other forms of connecting mechanism (not shown in the figure). It shall be noted that components and structure of the server device 200 as shown in FIG. 2 are just for illustration, but not for limitation. The server device 200 may also have other components and structures according to requirements. In addition, optionally, the server device 200 can further comprise an input apparatus 210 and an output apparatus 212 (not shown).

The processor 202 can be a central processing unit (CPU) or other forms of processing units having capabilities of processing data and/or executing instruction, and can control other components in the server device 200 to perform desired functions.

The storage apparatus 204 can comprise one or more computer program products. The computer program product can comprise various forms of computer readable storage medium, for example, a volatile storage and/or a non-volatile storage. The volatile storage can for example comprise a random access memory (RAM) and/or a cache memory and the like. The non-volatile storage can for example comprise a read-only memory (ROM), hard disk, and a flash memory and the like. One or more computer program instructions can be stored on the computer readable storage medium. The processor 202 can execute the program instructions, so as to realize functions (realized by the processor) in the embodiments of the present disclosure described below or other desirable functions. Various application programs and various data can be stored in the computer readable storage medium, for example, various data used and/or produced by the application programs and so on.

The communication apparatus 206 can implement wire or wireless communication.

The input apparatus 210 can be an apparatus used by a user at a server to input an instruction, and may comprise one or more of a keyboard, a mouse, a microphone and a touch screen, etc. The instruction may for example be an instruction for rejecting the uploaded image or an instruction for accepting the uploaded image.

The output apparatus 212 can output various information (for example, image or sound) to outside, and can comprise one or more of a display, a speaker, and so on.

Optionally, the exemplary server device for implementing the image authentication method and server according to the embodiments of the present disclosure can be implemented as for example a notebook computer, a desktop computer, a workstation and so on.

Figure 3:
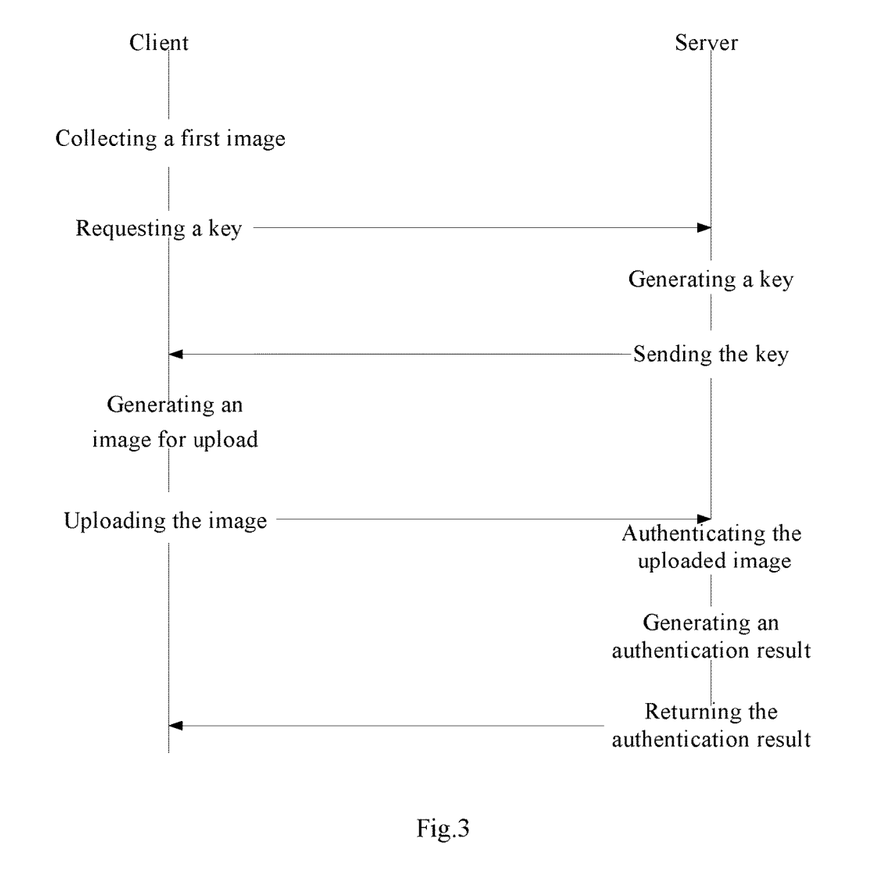
FIG. 3 is a schematic diagram illustrating information interaction between the client and the server according to the embodiments of the present disclosure.

FIG. 3 is a schematic diagram illustrating information interaction between a client and a server according to the embodiments of the present disclosure.

At the client, after a first image is collected by a user using an image collecting apparatus, the client requests a key from the server. Then, the server generates a key for the client and sends the generated key to the client in response to the request for key from the client.

At the client, image processing is performed on the collected first image by using the key received from the server, so as to generate an image for upload (second image), and the generated image for upload (second image) is uploaded to the server. Then, the uploaded image is authenticated at the server based on the key so as to generate an authentication result, and then the authentication result is returned to the client.

Figure 4A:
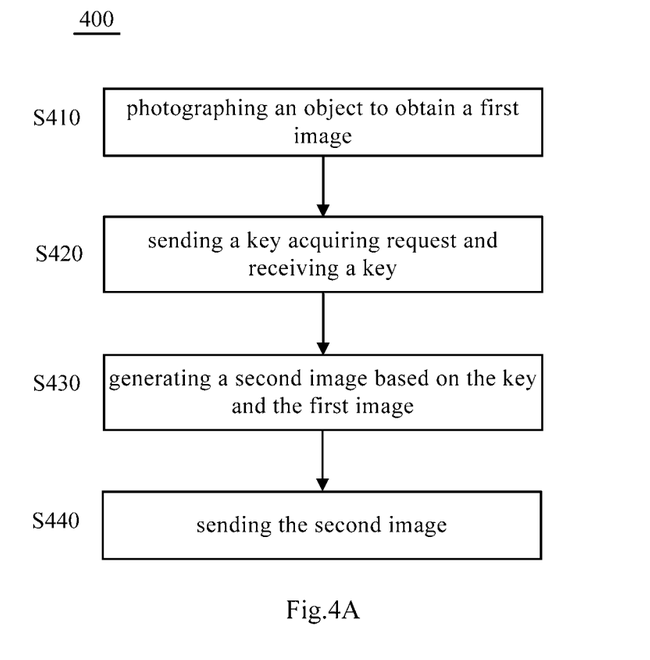
FIG. 4A and FIG. 4B are schematic flowcharts of the image processing method according to the embodiments of the present disclosure.
Figure 4B:
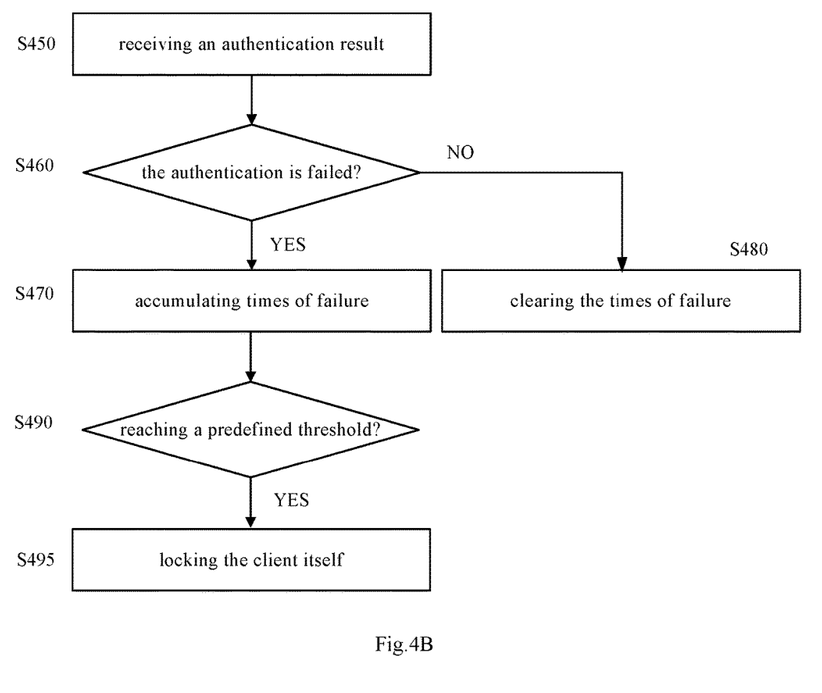

Below, the image processing method 400 for the client according to the embodiments of the present disclosure will be described with reference to FIG. 4A and FIG. 4B.

At step S410, the client photographs an object to obtain a first image. Here, the image collecting apparatus 110 of the electronic device as shown in FIG. 1 is adopted to photograph the object to obtain the first image of the photographed object. Optionally, the object may be but not limited to a valid certificate of a user, for example, an identity certificate, a passport, a driver license, etc. The first image may be a certificate image of the valid certificate of the user.

At step S420, the client sends a key acquiring request to a server, and receives a key from the server. Optionally, only after the client invokes the image collecting apparatus 110 of the electronic device as shown in FIG. 1 to photograph the object in real time, the step S420 is performed. According to the embodiments of the present disclosure, the key is received from the server through an encrypted channel, and the key changes with time.

At step S430, the client generates a second image based on the key received from the server and the first image. The client can generate the second image by using a steganography algorithm based on the key and the first image, that is, the key and the first image are merged by the steganography algorithm to generate the second image. According to the embodiments of the present disclosure, the steganography algorithm is performed in an encrypted mode.

For example, the steganography algorithm modifies the first image into the second image directly based on the key. As a particular example, the steganography algorithm can modify pixel values of a plurality of pixel positions in the first image based on the key, so as to modify the first image into the second image directly. In this particular example, the plurality of pixel positions can be appointed by the client and the server, or can be defined by the key, or can be determined by performing image analysis on the first image, or can be determined based on the key and image analysis on the first image. As another particular example, the steganography algorithm can add specific contents at specific positions of the first image based on the key, so as to modify the first image into the second image directly. In this particular example, the specific positions may be appointed by the client and the server, or can be defined by the key.

As another example, the steganography algorithm synthesizes the second image based on the key and the first image. Under such circumstance, according to the embodiments of the present disclosure, at step S430, the first image is deleted.

According to the embodiments of the present disclosure, for example, in case that the second image is generated by the steganography algorithm modifying parities of pixel values of a plurality of pixel positions in the first image, the key can prescribe the plurality of pixel positions in the first image, while the steganography algorithm can prescribe that the pixel values after being modified are all odd (or even) in advance; or the key can prescribe the parities of the pixel values at the plurality of pixel positions in the first image; or the key can only prescribe the parities of the pixel values after being modified, while the steganography algorithm can perform image analysis on the first image so as to obtain the plurality of pixel positions in the first image.

At step S440, the client sends the generated second image to the server. According to the embodiments of the present disclosure, the second image is sent to the server through an encrypted channel.

According to the embodiments of the present disclosure, after generating the second image, the client can further display the second image on a display of the output apparatus of the electronic device 100 as shown in FIG. 1, such that the user can determine whether to accept and send the generated second image. In this case, only when the client receives a user operation indicating to accept and send the generated second image, the step S440 is performed.

According to the embodiments of the present disclosure, after sending the generated second image to the server, at step S450, the client further receives an authentication result on the second image from the server which indicates whether authentication on the second image is failed.

At step S460, it is judged whether the authentication result indicates that the authentication is failed.

In case that the authentication result indicates that the authentication is failed, at step S470, times of failure are accumulated. On the other hand, in case that the authentication result indicates that the authentication is succeeded, at step S480, the times of failure are cleared.

At step S490, it is judged whether the times of failure reach a first predefined threshold. In case that the times of failure reach the first predefined threshold, at step S495, the client is locked itself, such that it can be avoided that the attacker continues using the client.

For example, a failure counter can be set. A value of the failure counter can be added by 1 at the step S470 in case that it is judged that the authentication result indicates that the authentication is failed. The client is locked itself at the step S495 in case that the value of the failure counter reaches the first predefined threshold at the step S490.

For further example, a register can be set, and the first predefined threshold is represented by a predefined number of bits of the register. An initial value of each bit of the register can be set as 0, and one bit having a value of 0 in the register is modified into 1 every time it is judged that the authentication result indicates that the authentication is failed. Then, it is judged that the times of failure reach to the predefined threshold when the predefined number of bits in the register have a value of 1.

According to the embodiments of the present disclosure, only the steganography algorithm at the client and the communication between the server and the client need to be encrypted, the second image to be uploaded (sent) is stored in an unencrypted mode, and thus amount of calculation and degree of complexity at the client can be reduced.

In addition, since the second image generated by the steganography algorithm has a visual effect essentially the same as that of the first image, decision on the image quality and the like can be made based on the second image and thus the user can confirm whether to upload the second image by checking the second image.

According to the embodiments of the present disclosure, after the client obtains the first image by photographing an object, the client requests a key from the server in real time and receives the key from the server in real time, and then the client generates a second image base on the key received in real time and the first image by using the steganography algorithm. As such, it can be avoided that the second image uploaded from the client is not generated by the client based on the first image photographed by the client, for example, the client invokes an image stored in the storage apparatus of the electronic device as shown in FIG. 1, or the client obtains an image from another electronic device via network. Therefore, it can be avoided effectively that the attacker misuses a certificate image originally generated by another one (first image).

Figure 5:
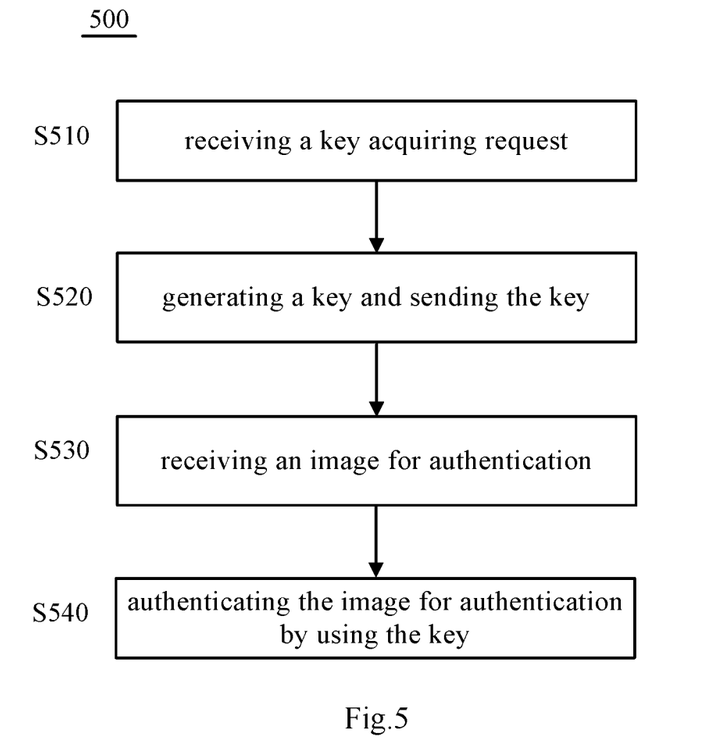
FIG. 5 is a schematic flowchart of an image authentication method according to the embodiments of the present disclosure.

Next, an image authentication method at the server according to the embodiments of the present disclosure will be described briefly with reference to FIG. 5.

At first, at step S510, the server receives a key acquiring request from the client. According to the embodiments of the present disclosure, the server receives the key acquiring request from the client through an encrypted channel.

At step S520, the server generates a key in real time in response to the key acquiring request, and sends the key generated in real time to the client. The key changes with time, and can be interpreted as a manner of generating a second image based on a first image by the steganography algorithm.

For example, after receiving the key acquiring request, the server generates a session identification for a session initiated by the client and including the key acquiring request in response to the key acquiring request, and associates and stores the key and the session identification. Next, the session identification should be used when the client sends an image for authentication to the server and when the server sends an authentication result. It should be noted that, when the client sends a new key acquiring request to the server again, the server generates a new session identification for a new session including the new key acquiring request.

For example, in case that a second image is generated by the steganography algorithm modifying parities of pixel values at a plurality of pixel positions in the first image, the key can prescribe the plurality of pixel positions in the first image, while the steganography algorithm can prescribe that the pixel values after being modified are all odd (or even) in advance; or the key can prescribe the parities of the pixel values at the plurality of pixel positions in the first image; or the key can only prescribe the parities of the pixel values after being modified, while the steganography algorithm can perform image analysis on the first image so as to obtain the plurality of pixel positions in the first image.

At step S530, the server receives an image for authentication from the client, that is, the second image sent or uploaded by the client to the server.

At step S540, the server authenticates the image for authentication based on the key. The server obtains an authentication result of failure authentication when the authentication on the image for authentication is failed. The server can perform other authentication processing on the image for authentication when the authentication on the image for authentication is succeeded, and can obtain an authentication result of success authentication when all of the authentications on the image for authentication are succeeded.

Optionally, the server authenticates whether the image for authentication and the prescription of the key are matched. For example, the server and the client make an agreement that each of the pixel values at the plurality of pixel positions prescribed by the key should be set to an odd number. After receiving the key, the client determines the plurality of pixel positions in the first image, and sets each of the pixel values at the plurality of pixel positions to an odd number. In Particular, when the pixel value at any of the plurality of pixel positions is even, the client modifies the pixel value at the pixel position to an odd number bigger than or smaller than the pixel value by 1; when the pixel value at any of the plurality of pixel positions is odd, the client keeps the pixel value at the pixel position unchanged. Then, after receiving the image for authentication sent or uploaded by the client (second image), the server reads the pixel values at the plurality of pixel positions prescribed by the key in the image for authentication, and judges whether the pixel values at the plurality of pixel positions are all odd. Alternatively, the server judges how many pixel values in the pixel values at the plurality of pixel positions are odd, and then the server can obtain an authentication result according to the number of the pixel positions in the plurality of pixel positions the pixel values of which comply with the prescription of the key. For example, when the pixel values of more than 95% of the plurality of pixel positions are odd, it can be determined that the authentication on the image for authentication is succeeded and other authentication processing can be performed on the image for authentication. Otherwise, when the pixel values of less than 95% of the plurality of pixel positions are odd, it can be determined that the authentication on the image for authentication is failed.

Optionally, the server authenticates the image for authentication based on the key by using the steganography algorithm. For example, the server generates a disassembled key based on the image for authentication by disassembling the steganography algorithm, then judges whether the disassembled key is matched with the key, and determines that the authentication on the image for authentication is failed in case that the disassembled key is not matched with the key and that other authentication processing can be performed on the image for authentication in case that the disassembled key is matched with the key.

Particularly, for example, in case that the second image is generated by modifying the parities of the pixel values at the plurality of pixel positions in the first image and the key prescribes that the plurality of pixel positions in the first image and the parities of the pixel values thereof, the server can determine the plurality of pixel positions in the image for authentication based on the key, then read the pixel values at the plurality of pixel positions in the image for authentication, and judge whether the parities of the read pixel values at the plurality of pixel positions are same as the parities prescribed by the key. In other words, in this case, the disassembled key can be obtained when disassembling the steganography algorithm according to the read pixel values at the plurality of pixel positions, and the disassembled key indicates that the parities of the read pixel values at the plurality of pixel positions. It can be determined that the authentication on the image for authentication is failed in case that the disassembled key is not matched with the key, and other authentication processing can be performed on the image in case that the disassembled key is not matched with the key. It can be determined that the disassembled key is matched with the key in following several cases: the disassembled key is completely same as the key, or the disassembled key is partially same as the key, or degree of matching between the disassembled key and the key goes beyond a predefined matching degree threshold.

Particularly, for further example, in case that the second image is generated by modifying the parities of the pixel values at the plurality of pixel positions in the first image, the server and the client make an appointment on the plurality of pixel positions, and the key prescribes the parities of the pixel values at the plurality of pixel positions, the server can read the pixel values at the plurality of pixel positions in the image for authentication, and disassemble the steganography algorithm to obtain the disassembled key according to the read pixel values at the plurality of pixel positions, the disassembled key indicates that the parities of the read pixel values at the plurality of pixel positions. It can be determined that the authentication on the image for authentication is failed in case that the disassembled key is not matched with the key, and other authentication processing can be performed on the image in case that the disassembled key is not matched with the key.

In addition, according to the embodiments of the present disclosure, after obtaining an authentication result, the server can return the authentication result to the client. Particularly, the server returns to the client that the authentication is failed in case that the authentication on the image for authentication is failed. Optionally, the server returns to the client that the authentication is succeeded in case that all of the authentications on the image for authentication are succeeded.

According to the embodiments of the present disclosure, during the process of logging into the server, the client can send a device identification of the client to the server, for example, an unique identification of the electronic device as shown in FIG. 1 (which may be a device serial number of the electronic device, or a telephone number if the electronic device is a mobile phone), or the client can send the device identification of the client to the server in the key acquiring request sent by the client to the server. In this case, times of failure associated with the client are accumulated in case that the server determines that the authentication is failed, and times of failure associated with the client are cleared in case that the server determines that the authentication is succeeded. When the times of failure associated with a certain client reach a second predefined threshold, the server will refuse any further access from the electronic device as shown in FIG. 1 for implementing the certain client.

According to the embodiments of the present disclosure, the server further stores a time at which the key is generated as a key generation time, or stores a time at which the key is sent to the client as a key sending time, and the key generation time or the key sending time can be used as an expiration period start time. When the server receives the image for authentication from the client, the server sets a time at which the image for authentication is received as an image receiving time. The server can calculate a time difference between the expiration period start time and the image receiving time, and can determines that the authentication is failed in case that the time difference exceeds an expiration period.

According to the embodiments of the present disclosure, since the key changes with time, the server can obtain an authentication result of failure authentication even if the attacker obtains a second image which has already been uploaded by another one. Therefore, it can be avoided that the attacker misuses the stegano certificate image (second image) of another one.

Below, the schematic block diagram of a client device according to the embodiments of the present disclosure will be described with reference to FIG. 6.

Figure 6:
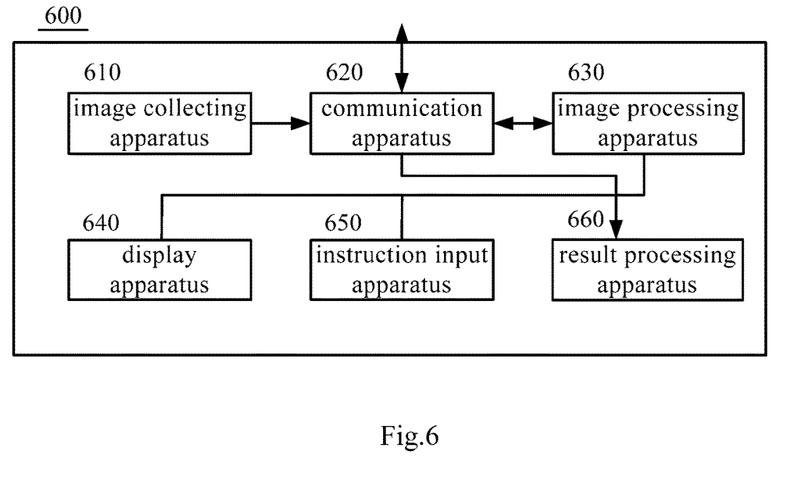
FIG. 6 is a schematic block diagram of a client device according to the embodiments of the present disclosure.

As shown in FIG. 6, the client device according to the embodiments of the present disclosure comprises: an image collecting apparatus 610, a communication apparatus 620 and an image processing apparatus 630.

The image collecting apparatus 610 is configured to photograph an object to obtain a first image. The image collecting apparatus 610 can be implemented by the image collecting apparatus 110 in the electronic device 100 as shown in FIG. 1, and can perform the step S410 in the image processing method 400 according to the embodiments of the present disclosure. The object here may be but not limited to a valid certificate of a user, for example, an identity card, a passport, a driver license and so on, and the first image can be a certificate image of the valid certificate of the user.

The communication apparatus 620 is configured to send a key acquiring request to the server and receive a key from the server. In particular, the communication apparatus 620 sends the key acquiring request to the server only after the image collecting apparatus 610 collects the first image. The communication apparatus 620 sends the key acquiring request to the server through an encrypted channel, and receives the key from the server through the encrypted channel, the key changes with time.

After the communication apparatus 620 receives the key from the server, the image processing apparatus 630 is configured to generate a second image based on the key and the first image. The image processing apparatus 630 can be implemented by the processor 102 in the electronic device 100 as shown in FIG. 1 executing computer program instructions stored in the storage apparatus 104, and can perform the step S430 in the image processing method 400 according to the embodiments of the present disclosure. The image processing apparatus 630 can generate the second image based on the key and the first image by using the steganography algorithm, that is, merge the key and the first image by using the steganography algorithm so as to generate the second image. According to the embodiments of the present disclosure, the image processing apparatus 630 performs the steganography algorithm in an encrypted mode.

Then, after the image processing apparatus 630 generates the second image, the communication apparatus 620 further sends the second image to the server. The communication apparatus 620 sends the second image to the server through the encrypted channel.

In addition, the client device 600 can further comprise a display apparatus 640 and an instruction input apparatus 650. The display apparatus 640 can be implemented by the output apparatus in the electronic device 100 as shown in FIG. 1, and is configured to display the second image for the user determining whether to accept the second image. The instruction input apparatus 650 can be implemented by the input apparatus in the electronic device 100 as shown in FIG. 1, and is configured for the user inputting instructions.

In addition, after the communication apparatus 620 sends the second image to the server, the communication apparatus 620 further receives an authentication result on the second image from the server, the authentication result indicates whether the authentication on the second image is failed. In particular, the communication apparatus 620 can be implemented by the communication apparatus 114 in the electronic device 100 as shown in FIG. 1, and can be configured to perform the steps S420, S440 and S450 in the image processing method 400 according to the embodiments of the present disclosure.

The client device 600 can further comprise a result processing apparatus 660, which judges whether the authentication result received from the server indicates that the authentication is failed, accumulates times of failure if it is judged that the authentication result indicates that the authentication is failed, and clears times of failure if it is judged that the authentication result indicates that the authentication is succeeded. In addition, the result processing apparatus 660 can further judge whether the times of failure reach a predefined threshold. If it is judged that the times of failure reach the predefined threshold, the client is locked itself, such that it can be avoided that the attacker continues using the client. In particular, the result processing apparatus 660 can be implemented by the processor 102 in the electronic device 100 as shown in FIG. 1 executing the computer program instructions stored in the storage apparatus 104, and can perform the steps S460, S470, S480, S490 and S495 in the image processing method 400 according to the embodiments of the present disclosure.

Below, the schematic block diagram of a server device according to the embodiments of the present disclosure will be described with reference to FIG. 7.

Figure 7:
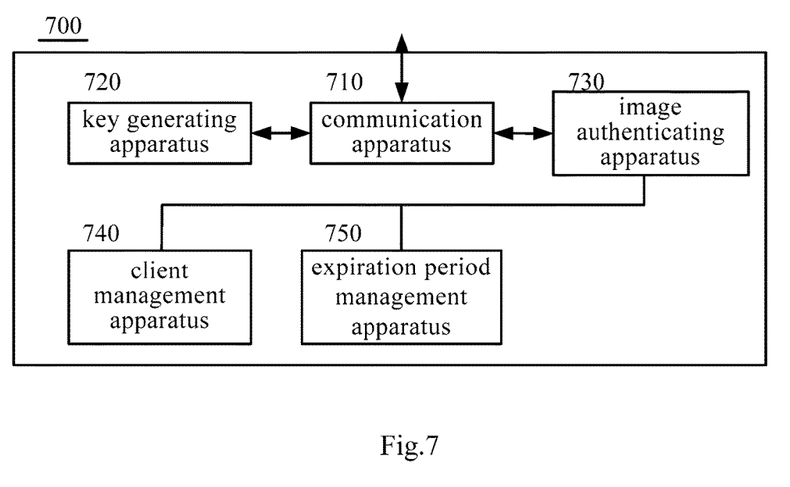
FIG. 7 is a schematic block diagram of a server device according to the embodiments of the present disclosure.

As shown in FIG. 7, the server device according to the embodiments of the present disclosure comprises a communication apparatus 710, a key generating apparatus 720 and an image authenticating apparatus 730.

The communication apparatus 710 is configured to receive a key acquiring request from the client. Preferably, the communication apparatus 710 receives the key acquiring request from the client through an encrypted channel. The communication apparatus 710 can be implemented by the communication apparatus 206 in the server device 200 as shown in FIG. 2.

The key generating apparatus 720 is configured to generate the key in real time in response to the key acquiring request received by the communication apparatus 710 from the client, the key changes with time and is configured to indicate a manner in which the client device generates a second image based on a first image. The key generating apparatus 720 can be implemented by the processor 202 in the server device 200 as shown in FIG. 2 executing the computer program instructions stored in the storage apparatus 204.

In addition, the key generating apparatus 720 can be further configured to generate a session identification for a session initiated by the client and comprising the key acquiring request in response to the key acquiring request, and associates and stores the key and the session identification in the storage apparatus 204 in the server device 200 as shown in FIG. 2. It should be noted that when the client sends a new key acquiring request to the client again, the key generating apparatus 720 in the server device generates a new session identification for a new session including the new key acquiring request.

After the key generating apparatus 720 generates the key, the communication apparatus 710 sends the key to the client. Preferably, the communication apparatus 710 sends the key to the client through an encrypted channel.

After the communication apparatus 710 sends the key to the client, the communication apparatus 710 receives an image for authentication from the client, that is, the second image sent/uploaded by the client to the server.

Then, the image authenticating apparatus 730 authenticates the image for authentication based on the key. The image authenticating apparatus 730 obtains an authentication result of failure authentication when the authentication on the image for authentication is failed, while the image authenticating apparatus 730 can perform other authenticating processing on the image for authentication when the authentication on the image for authentication is succeeded and obtains an authentication result of success authentication when all of the authentications are succeeded. The image authenticating apparatus 730 can be implemented by the processor 202 in the server device 200 as shown in FIG. 2 executing the computer program instructions stored in the storage apparatus 204, and can be configured to perform the step S540 in the image authentication method 500 according to the embodiments of the present disclosure.

In addition, after the image authentication apparatus 730 obtains the authentication result, the communication apparatus 710 can further return the authentication result to the client. In particular, in case that the authentication on the image for authentication is failed, the communication apparatus 710 returns to the client that the authentication is failed. Optionally, in case that all of the authentications on the image for authentication are succeeded, the communication apparatus 710 returns to the client that the authentication is succeeded.

In addition, the server device 700 can further comprise a client management apparatus 740 which is configured to manage the client. During the process of logging into the server, the client can send a device identification of the client to the server, for example, an unique identification of the electronic device as shown in FIG. 1 (which may be a device serial number of the electronic device, or a telephone number if the electronic device is a mobile phone), or the client can send the device identification of the client to the server in the key acquiring request sent by the client to the server. In this case, the client management apparatus 740 accumulates times of failure associated with the client in case that the image authenticating apparatus 730 determines that the authentication is failed, and clears times of failure associated with the client in case that the image authenticating apparatus 730 determines that the authentication is succeeded. When the times of failure associated with a certain client reach a second predefined threshold, the client management apparatus 740 will refuse any further access from the electronic device as shown in FIG. 1 for implementing the certain client. The client management apparatus 740 can be implemented by the processor 202 in the server 200 as shown in FIG. 2 executing the computer program instructions stored in the storage apparatus 204.

In addition, the server further comprises an expiration period management apparatus 750. According to the embodiments of the present disclosure, the storage apparatus 720 further stores a time at which the key is generated as a key generation time, or stores a time at which the key is sent to the client as a key sending time, and the key generation time or the key sending time can be used as an expiration period start time. When the communication apparatus 710 receives the image for authentication from the client, the expiration period management apparatus 750 sets a time at which the image for authentication is received as an image receiving time. The expiration period management apparatus 750 can calculate a time difference between the expiration period start time and the image receiving time, and determines that a valid period of the key has expired in case that the time difference exceeds a key expiration period. Accordingly, the image authenticating apparatus 730 determines that the authentication is failed. The expiration period management apparatus 750 can be implemented by the processor 202 in the server 200 as shown in FIG. 1 executing the computer program instructions stored in the storage apparatus 204.

In addition, according to the embodiments of the present disclosure, there is further provided a client device, which comprises one or more processors, one or more storage apparatuses, a communication apparatus, an image collecting apparatus, and computer program instructions stored in the storage apparatus. When the computer program instructions are executed by the processor, following steps are performed: controlling the image collecting apparatus to photograph an object to obtain a first image; controlling the communication apparatus to send a key acquiring request to a server and receive a key from the server; generating a second image based on the key and the first image; and controlling the communication apparatus to send the second image to the server.

In addition, according to the embodiments of the present disclosure, there is further provided a computer program product for image processing, which comprises one or more computer readable storage media with computer program instructions stored thereon. The computer program instructions can be executed by the processor, such that the processor controls an image collecting apparatus to photograph an object to obtain a first image, controls a communication apparatus to send a key acquiring request to a server and receive a key from the server; generates a second image based on the key and the first image; and controls the communication apparatus to send the second image to the server.

In addition, according to the embodiments of the present disclosure, there is provided a server device, which comprises one or more processors, one or more storage apparatuses, a communication apparatus, and computer program instructions stored in the storage apparatus. When the computer program instructions are executed by the processor, following steps are performed: controlling the communication apparatus to receive a key acquiring request from a client; generating a key and sending the key to the client in response to the key acquiring request; controlling the communication apparatus to receive an image for authentication from the client; and authenticating the image for authentication according to the key.

In addition, according to the embodiments of the present disclosure, there is further provided a computer program product for image authentication, which comprises one or more computer readable storage media with computer program instructions stored thereon. The computer program instructions can be executed by the processor, such that the processor controls a communication apparatus to receive a key acquiring request from a client; generates a key and sends the key to the client in response to the key acquiring request; controls the communication apparatus to receive an image for authentication from the client; and authenticates the image for authentication according to the key.

According to the embodiments of the present disclosure, only the steganography algorithm at the client and the communication between the server and the client need to be encrypted, the second image to be uploaded (sent) is stored in an unencrypted mode, and thus amount of calculation and degree of complexity at the client can be reduced.

In addition, since the second image generated by the steganography algorithm has a visual effect essentially the same as that of the first image, decision on the image quality and the like can be made based on the second image and thus the user can confirm whether to upload the second image by checking the second image.

According to the embodiments of the present disclosure, after the client obtains the first image by photographing an object, the client requests a key from the server in real time and receives the key from the server in real time, and then the client generates a second image base on the key received in real time and the first image by using the steganography algorithm. As such, it can be avoided that the second image uploaded from the client is not generated by the client based on the first image photographed by the client, for example, the client invokes an image stored in the storage apparatus of the electronic device as shown in FIG. 1, or the client obtains an image from another electronic device via network. Therefore, it can be avoided effectively that the attacker misuses a certificate image originally generated by another one (first image).

According to the embodiments of the present disclosure, since the original image (first image) is essentially same as the stegano image (second image) in appearance, it is difficult for the attacker to crack the steganography algorithm by collecting second images.

Although exemplary embodiments are already described herein by referring to the accompanying drawings, it shall be understood that the above exemplary embodiments are just for illustration, and do not intend to limit the scope of the present disclosure thereto. Those ordinary skilled in the art can make various alternations and amendments without departing from the scope and spirit of the present disclosure. All these alternations and amendments intend to be included in the scope of the present disclosure claimed in the Claims.

What is claimed is:

1. An image processing method for a client, comprising:
    photographing an object to obtain a first image;
    sending a key acquiring request to a server and receiving a key from the server;
    generating a second image for authentication based on the key and the first image; and
    sending the second image for authentication to the server,
    wherein the key is generated in real time by the server in response to the key acquiring request and the key changes with time, and
    wherein the server determines a time difference between a time at which the key is sent to the client and a time at which the second image for authentication is received from the client, and determines that the authentication is failed in case that the time difference exceeds a key expiration period.

2. The image processing method of claim 1, wherein the second image is generated by a steganography algorithm based on the key and the first image.

3. The image processing method of claim 2, wherein the second image is generated by modifying the first image directly.

4. The image processing method of claim 2, wherein the second image is synthesized by the steganography algorithm based on the key and the first image,
    wherein the image processing method further comprises:
    deleting the first image.

5. The image processing method of claim 2, wherein the steganography algorithm is executed in an encrypted mode.

6. The image processing method of claim 1, further comprising:
    displaying the second image after generating the second image; and
    receiving a user operation;
    wherein said sending the second image to the server is performed in case that the user operation indicates to send the second image.

7. The image processing method of claim 1, further comprising:
    receiving an authentication result on the second image from the server;
    accumulating times of failure in case that the authentication result indicates that the authentication is failed; and
    clearing the times of failure in case that the authentication result indicates that the authentication is succeeded.

8. The image processing method of claim 7, further comprising:
    locking the client in case that the times of failure reach a first predefined threshold.

9. The image processing method of claim 1, wherein the key is received from the server through an encrypted channel and the second image is sent to the server through the encrypted channel.

10. The image processing method of claim 1, wherein the client accesses the server via a device; and
    wherein sending a key acquiring request to a server includes sending a device identification of the client in the key acquiring request to the server.

11. The image processing method of claim 1, wherein the key received from the server is a unique key generated based on the key acquiring request.

12. An image authentication method for a server, comprising:
    receiving a key acquiring request from a client;
    generating a key and sending the key to the client in response to the key acquiring request;
    receiving a second image for authentication from the client; and
    authenticating the second image for authentication by using the key,
    wherein the second image is generated based on the key and a first image obtained through photographing an object by the client,
    wherein the key changes with time, and
    wherein the image authentication method for a server further comprises:
    determining a time difference between a time at which the key is sent to the client and a time at which the second image for authentication is received from the client; and
    determining that the authentication is failed in case that the time difference exceeds a key expiration period.

13. The image authentication method of claim 12, wherein said authenticating the second image for authentication by using the key comprises:
    generating a disassembled key based on the second image for authentication by disassembling the steganography algorithm; and
    determining that authentication on the second image for authentication is failed in case that the disassembled key is not matched with the key.

14. The image authentication method of claim 13, wherein said generating a disassembled key based on the second image for authentication by disassembling the steganography algorithm comprises:
    determining a plurality of pixel positions in the second image for authentication based on the key;
    reading pixel values at the plurality of pixel positions; and
    generating the disassembled key based on the read pixel values.

15. The image authentication method of claim 13, further comprising:
    returning to the client that the authentication is failed in case that the authentication on the second image for authentication is failed.

16. The image authentication method of claim 13, further comprising:
    generating a session identification in response to the key acquiring request; and
    associating and storing the key and the session identification after the key is generated.

17. The image authentication method of claim 13, wherein the key is sent to the client through an encrypted channel and the second image for authentication is received from the client through the encrypted channel.

18. A client device, comprising:
    an image collecting apparatus;
    a communication apparatus;
    one or more processors; and one or more storage apparatuses with computer program instructions stored thereon, the computer program instructions, when being executed by the processor, cause the processor:

controlling the image collecting apparatus to photograph an object to obtain a first image;

controlling the communication apparatus to send a key acquiring request to a server and receive a key from the server;

generating a second image for authentication based on the key and the first image; and controlling the communication apparatus to send the second image for authentication to the server, wherein the key is generated in real time by the server in response to the key acquiring request and the key changes with time, and wherein the server determines a time difference between a time at which the key is sent to the client device and a time at which the second image for authentication is received from the client device, and determines that the authentication is failed in case that the time difference exceeds a key expiration period.

* * * * *